United States Patent [19]

Pernick

[11] Patent Number: 5,477,382
[45] Date of Patent: Dec. 19, 1995

[54] OPTICAL CORRELATOR SYSTEM

[75] Inventor: Benjamin J. Pernick, Forest Hills, N.Y.

[73] Assignee: Northrop Grumman Corporation, Los Angeles, Calif.

[21] Appl. No.: 286,628

[22] Filed: Aug. 5, 1994

[51] Int. Cl.[6] ............................ G02B 27/42; G01B 9/02; G06E 3/00

[52] U.S. Cl. ..................... 359/559; 356/349; 359/561; 364/822

[58] Field of Search ............................ 359/29, 107, 108, 359/558, 559, 561; 356/349; 364/822

[56] References Cited

U.S. PATENT DOCUMENTS

| 4,573,198 | 2/1986 | Anderson | 359/561 |
| 4,696,061 | 9/1987 | Labrum | 359/559 |
| 5,005,946 | 4/1991 | Brandstetter | 359/559 |
| 5,121,228 | 6/1992 | Paek | 359/561 |
| 5,155,606 | 10/1992 | Landesman | 359/561 |
| 5,216,541 | 6/1993 | Takesue et al. | 359/559 |
| 5,235,461 | 8/1993 | Kirsch et al. | 359/561 |

FOREIGN PATENT DOCUMENTS 2-72336  3/1990  Japan ........................ 359/561

Primary Examiner—Martin Lerner
Attorney, Agent, or Firm—Terry J. Anderson; Karl J. Hoch, Jr.

[57] ABSTRACT

A system and method of optical correlation that avoids bias level terms in the optical correlation output. In the system and method, two coherent polarized component beams having frequencies $f_1$ and $f_2$ are derived from a light source. Portions of these component beams are converted to a reference electrical signal having a frequency $\Delta f = f_2 - f_1$. The sum $f_1 + f_2$ of the component beams is correlated under the control of a multiple of the reference electrical signal. The Fourier transform of the amplitude of the correlated light is projected and detected on a detection plane.

20 Claims, 4 Drawing Sheets

OPTICAL CORRELATOR SYSTEM

BACKGROUND OF THE INVENTION

1. Field of the Invention

The present invention relates to an optical correlator system.

Bias level terms, in mathematical equations for optical correlators of known type, degrade the accuracy of the output correlation value because such terms are additive to the true correlation signal. Thus, the correlation values or measurements are degraded by these unwanted bias level terms. Furthermore, such known optical correlators generally have a large dc term in the Fourier transform spectrum due to the unwanted bias terms. This dc term generates a sinc function distribution in the transform spectrum, which results in the side lobe levels of the sinc function being very large in regions of the spectrum, where the signal and reference functions, $f(x)$ and $f_R(x)$, respectively, have significant spectral content. Square law detection also further degrades the measurement.

The principal object of the invention is to provide an optical correlator that uses coherent light which has improved performance.

An object of the invention is to provide an optical correlator which produces no bias error due to recording component characteristics.

An object of the invention is to provide an optical correlator which produces no bias error that is necessarily introduced when bipolar signals and/or reference functions are to be correlated.

Another object of the invention is to provide an optical correlator which utilizes a heterodyne system to eliminate unwanted bias and measurement degradation.

Still another object of the invention is to provide an optical correlator which removes any residual bias error, not accounted for, with a dc blocking aperture in the Fourier transform plane.

Yet another object of the invention is to provide an optical correlator of single structure which functions efficiently, effectively and reliably.

Another object of the invention is to provide an optical correlator which avoids errors due to changing laser frequencies such as mode hops.

SUMMARY OF THE INVENTION

Heterodyne techniques are used to avoid the bias level terms in the optical correlation output.

In accordance with the invention, an optical correlator system comprises light source means for providing a coherent beam of light having two oppositely circularly polarized component beams having two different temporal frequencies herein called $f_1$ and $f_2$. A first beam splitting means transmits the two oppositely polarized component beams $f_1$ and $f_2$ and reflects a portion of emitted radiation. A linear polarizing means provides orthogonal linear polarization status of the component beams $f_1$ and $f_2$ transmitted by the first beam splitting means. A second beam splitting means transmits the linearly polarized beam $f_1$ in a determined direction and reflects the other linearly polarized beam $f_2$. A directing means directs the reflected beam $f_2$ in the determined direction. An optical polarization means changes the portion of emitted radiation reflected by the first beam splitting means to frequency component beams $f_1$ and $f_2$ having colinear polarization directions. A processing means processes the frequency component beams and provides an electrical reference signal of frequency $\Delta f = f_2 - f_1$. A signal processing means multiplies a signal function by a phase term under the control of $\Delta f$ and records a first modulated waveform. A reference signal processing means multiplies a reference function by the phase term under the control of $\Delta f$ and records a second modulated waveform. An optical transfer means projects the first modulated waveform onto the second modulated waveform. An optical means projects the Fourier transform of the amplitude of light of the projected modulated waveforms onto a plane. A detecting means detects the pattern in the plane of the Fourier transform, when $v$ is substantially equal to zero, wherein $v$ is the transform variable or spatial frequency variable. The detecting means has an output providing the Fourier transform. A filtering means controlled by the reference signal filters out the entire output of the detecting means except a temporal signal oscillating at $2\Delta f$. An output means has an input of the temporal signal and an output of a signal which is the square of the correlation value.

The light source means provides a laser beam of coherent light. The first beam splitting means consists of a non-polarization sensitive beam splitter. The linear polarizing means consists of polarizing means for changing the oppositely circularly polarized component beams into two orthogonal linearly polarized component beams $f_1$ and $f_2$. The second beam splitting means consists of a polarization-sensitive beam splitter.

The signal processing means comprises a signal multiplier for multiplying the signal function by the phase term under the control of the reference signal $\Delta f$ and a first recording means for recording a modulated waveform from the signal multiplier. The reference signal processing means comprises a reference multiplier for multiplying the reference function by the phase term under the control of the reference signal $\Delta f$ and a second recording means for recording a modulated waveform from the reference multiplier.

In accordance with the invention, an optical correlator system comprises a light source means for providing a coherent beam of light having two oppositely circularly polarized component beams. Each of the component beams have different frequencies. The non-polarization sensitive beam splitting means transmits the two oppositely circularly polarized component beams and reflects a portion of emitted radiation. The polarizing means is provided for changing the transmitted oppositely circularly polarized component beams into two orthogonal linearly polarized component beams. The polarization-sensitive beam splitting means reflects one of the linearly polarized beams and transmits the other of the linearly polarized beams in a determined direction. A mirror means directs the reflected one of the linearly polarized beams in the determined direction. The optical polarization means is provided for changing the reflected portion of emitted radiation to frequency component beams having colinear polarization directions. The detector and processing means provide an electrical reference signal from the frequency component beams which is the difference between the two frequencies $\Delta f$ and an offset frequency, $\delta$. The signal multiplier means multiplies a signal function by a phase term under the control of the reference signal $\Delta f$. The reference multiplier means multiplies a reference function by the phase term of offset frequency $\delta$. The first recording means records a modulated waveform from the signal multiplier means. The second recording means records a modulated waveform from the reference multiplier means. The optical transfer means projects the waveform recorded on the first recording means onto the waveform recorded on the second recording means. The optical means projects the Fourier transform of the amplitude of light output by the second recording means onto a plane. The detecting means detects the pattern in the plane of the Fourier transform when v is substantially equal to zero and the detecting means has an output providing the Fourier transform, wherein v is the transform variable or spatial frequency variable. The filtering means controlled by the reference signal filters out the entire output of the detecting means except a temporal signal oscillating at 2Δf. The output means has an input inputting the temporal signal and an output outputting a signal which is the square of the correlation value.

The phase term is exp (j2πΔft), wherein $j=\sqrt{-1}$, Δf=frequency and t=time. The modulated waveform recorded in the first recording means is $f(x-x_s)exp(j2\pi\Delta ft)$ where $x_s$ represents a shift, and the modulating waveform recorded in the second recording means is $f_R^*(x)exp(j2\pi\Delta ft)$ where $f_R^*(x)$ is the complex conjugate of $f_R(x)$. The amplitude M(x) of light output by the second recording device is equal to exp(jωt) $[B_o+f(x-x_s)exp(j2\pi\Delta ft)][B_R+f_R^*(x)exp(j2\pi\Delta ft)]$, where $\omega=2\pi f_1$, or $2\pi f_2$, wherein $B_o$ is the bias level associated with the signal, $B_R$ is the bias level associated with the reference signal, $f_R^*$ is the complex conjugate reference function, x is the parameter and $x_s$ is the shift or displacement parameter.

In accordance with the invention, an optical correlator system comprises a light source means for providing a coherent beam of light having two oppositely circularly polarized component beams. Each of the component beams have two different frequencies $f_1$ and $f_2$. The first beam splitting means transmits the two oppositely polarized component beams $f_1$ and $f_2$ and reflects a portion of emitted radiation. The linear polarizing means is provided for orthogonal linear polarization of the component beams $f_1$ and $f_2$ transmitted by the first beam splitting means. The second beam splitting means transmits the linearly polarized beam $f_1$ in a determined direction and reflects the other linearly polarized beam $f_2$. The directing means directs the reflected beam $f_2$ in the determined direction. The optical polarization means is provided for changing the portion of emitted radiation reflected by the first beam splitting means to frequency component beams $f_1$ and $f_2$ having colinear polarization directions. The processing means provides an electrical reference signal $\Delta f=f_2-f_1$ from the frequency component beams. The optical means expands and collimates the frequency component beams $f_1$ and $f_2$. The signal processing means modifies a signal function by a temporal frequency offset under the control of Δf and records a first modulated waveform. The reference signal processing means modifies a reference function by the temporal frequency offset under the control of the reference signal and records a second modulating waveform. The optical transfer means records the expanded and collimated beams under the control of the modified signal and reference functions. The optical means projects the Fourier transform of the amplitude of light of the combined modulated beams onto a plane. The detecting means detects the pattern in the plane of the Fourier transform when v is substantially equal to zero, wherein v is the transform variable. The detecting means has an output providing the Fourier transform. The filtering means, controlled by the reference signal, filters out the entire output of the detecting means except for a temporal signal oscillating at 2Δf. The output means has an input of the temporal signal and an output of a signal which is the square of the correlation value.

The temporal frequency offset is δ and is derived from Δf, wherein Δf=frequency and t=time.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
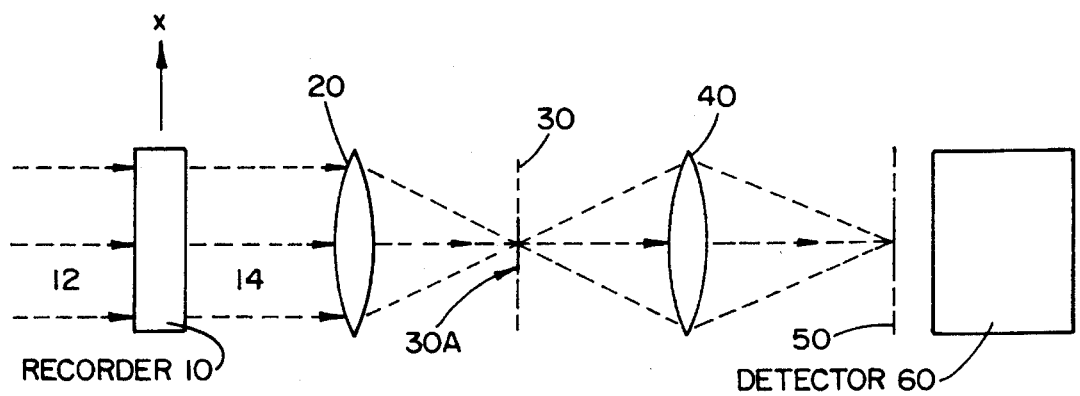
FIG. 1 is a block diagram of a first embodiment of an optical correlator of the prior art.

FIG. 1 discloses a matched filter correlator of the prior art and is shown as a one-dimensional system, although an extension to two dimensions is straightforward. What is desired in the output plane is the correlation product given by $$C(x_s)=\int f(x+x_s)f_R(x)dx \quad (1)$$

wherein $f_R(x)$ is the reference function, $x_s$ is the shift or displacement parameter, $f(x+x_s)$ is the signal to be correlated and $C(x_x)$ is the correlation.

The signal to be correlated is presented on an input recording device or recorder 10, such as, for example, an acousto-optic cell (AO), or spatial light modulator (SLM), as a transmittance variation. A coherent light beam 12 illuminates recorder 10. A transmitted electric field, or light amplitude 14, is modulated in magnitude and/or phase. In the ideal case, the light amplitude exiting input device 10 is proportional to $f(x+x_s)$. A so-called Fourier transform lens 20 is positioned typically one focal length beyond the recorder 10. In the back focal plane 30 of lens 20 the light amplitude distribution is proportional to the Fourier integral transform of $f(x+x_s)$. This transform is expressed as $$F(v) \exp(-j2\pi x_s v) \quad (2)$$

where v is the transform variable and F(v) is the Fourier transform of the unshifted function f(x).

Back focal plane 30 also contains a recording 30A of the Fourier integral transform of the reference function $F_R(V)$. This is called the matched filter. Ideally, the recorded transform is proportional to the conjugate $F_R^*(v)$, or a function derived from $F_R^*(v)$. Techniques to form this quantity can involve well-known holographic methods. The matched filter recording 30A is made as a transmittance variation that in effect multiplies the Fourier transform pattern of the light amplitude pattern for the input signal with what is stored in matched filter recording 30A. The net light amplitude transmitted by recording 30A is proportional to the product $$F_R^*(v)F(v) \exp(-j2\pi x_s v) \quad (3)$$

An inverse transform lens 40 is typically spaced one focal length from the plane of matched filter recording 30A. Lens 40 has a back focal plane 50 which contains the correlation pattern given by the light amplitude distribution $$C(x_c,x_s)=\int F_r^*(v)F(v)\exp(-j2\pi x_s v)\exp(-j2\pi x_c v)dv \quad (4)$$

where $x_c$ is a position coordinate in output plane 50.

For unipolar signals where f(x) is greater than, or equal to, zero and $f_R(x)$ is greater than, or equal to, zero, the output correlation $C(x_c,x_s)$ contains no bias error and consequently is exact. A detector 60 observing the pattern in plane 50 results in a measure of the square of the correlation value.

In more commonly occurring cases, the function $f_R(x)$ and f(x) are bipolar and/or a bias level is inherent to the recording device. If $B_o$ and $B_R$ represent the bias levels associated with the signal and reference signals, respectively, the correlation pattern is given by $$C'(x_s)=\int[B_o+f(x+x_s)][B_R+f_R(x)]dx \quad (5)$$

In terms of the spatial frequency variable v $$C'(x_c,x_s)=\int[B_R\text{sinc}(v)+F_R^*(v)][B_o\text{sinc}(v)+F(v)\exp(-j2\pi x_s v)]\exp(-j2\pi x_c v)dv \quad (6)$$

where sinc(v) is the sinc function. The correlation pattern is then composed of four terms $$C'(x_s)=\int B_oB_R dx+\int B_of_R(x)dx+\int Bf(x+x_s)\,dx+\int f_R(x)f(x+x_s)dx \quad (7)$$

The last term is the desired correlation value. The first three terms are the unwanted bias terms that degrade the correlation measurement. Since the output light amplitude distribution in output plane 50 is detected with a square law detection device or detector 60, the measured output is proportional to the squared value of $$C'(x_s)]^2 \quad (8)$$

further degrading the measurement.

Figure 2:
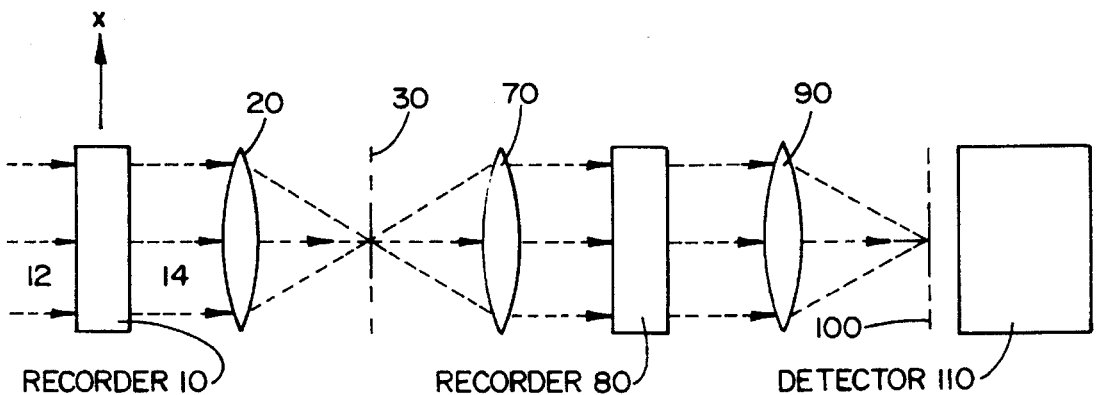
FIG. 2 is a block diagram of a second embodiment of an optical correlator of the prior art.

A second typical correlator configuration that suffers from the same bias degradation is shown in FIG. 2. As in the first optical system of FIG. 1, the Fourier transform of the input is contained in the light amplitude distribution in plane 30. In the embodiment of FIG. 2, however, there is no matched filter placed at the recording 30A of the Fourier integral transform as in FIG. 1. Instead, a lens 70 projects an image of the input signal onto a second recording device or recorder 80. The reference function is contained in recorder 80. A transform lens 90 forms the Fourier transform of the product of the signal and reference functions in an output plane 100. This light amplitude distribution is described by $$C(x_s,v)=\int[B_o+f(x+x_s)][B_R+f_R(x)]\exp(-j\,2\pi vx)dex \quad (9)$$

A measure of the correlation is obtained at the position in output plane 100 where v=0, that is, $$C(x_s,0)=\int[B_o+f(x+x_s)][B_R+f_R(x)]dx \quad (10)$$

Again, the bias terms degrade the measurement. A detector 110 detects the output light amplitude distribution in output plane 100.

One method to reduce the adverse influence of bias levels is known. In the correlator of FIG. 1, a so-called dc block, that is, a small opaque region, is located in the plane 30 about the center of the light pattern of the input signal. This feature could be included in the transmissive matched filter located at the recording 30A. A similar technique would be used in the correlator shown in FIG. 2.

The dc block cannot, however, completely remove the influence of a bias level. If a bipolar signal is a real function with no phase variation, for example, the dc bias level must be at least as large as the most negative value of the signal. For pure phase modulation, the phase variation must be sufficiently small to represent the signal $$f(x)=\exp[j\phi(x)]\approx 1+j\phi(x)$$

These constraints result in a large dc term in the transform spectrum.

In all cases, a large dc term generates a sinc function distribution in the transform spectrum. Thus, the side lobe levels of the sinc function can be very large in regions of the spectrum where the functions f(x) and $f_R(x)$ have significant spectral content. Square law detection further degrades the measurement.

Figure 3:
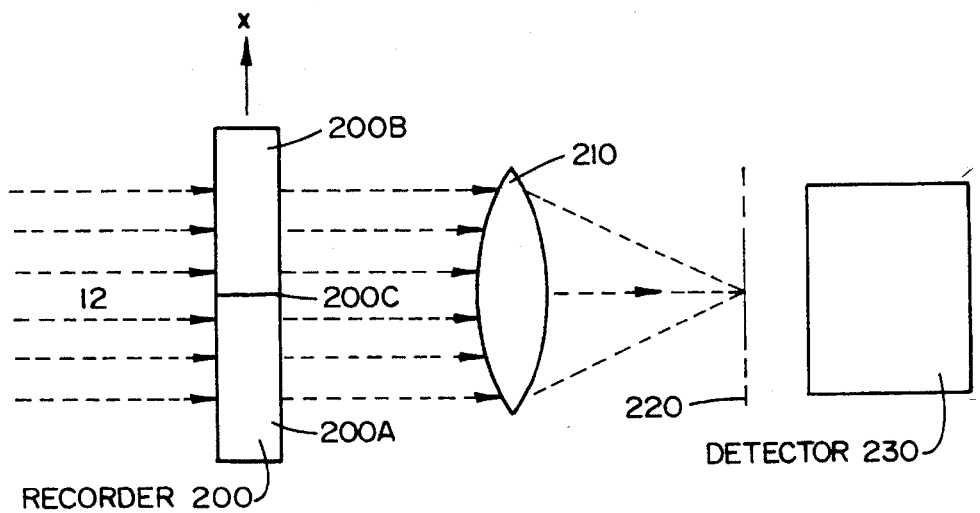
FIG. 3 is a block diagram of the front end portion of a third embodiment of an optical correlator of the prior art.

The front end portion of a third type of known optical correlator is shown in FIG. 3. This correlator is known as a joint transform correlator. Both reference and signal functions are encoded over the same recording device or recorder 200. Thus, for example, region 200A contains the reference function and region 200B contains the signal to be correlated. The origin of a coordinate system associated with the reference and signal functions is centered at 200C between recordings. The signal function in region 200A is f(x+a) and in region 200B it is $f_R(x-a)$, where "a" is the displacement of each pattern with respect to the center. The displacements of each function need not be symmetrically arranged about the center. The overall width of the recorder is considered to be 4a.

Laser light 12 illuminates both recordings on recorder 200 simultaneously. The light amplitude components transmitted through regions 200A and 200B of recorder 200 are, respectively, f(x+a) and $f_R(x-a)$. A lens 210 projects the Fourier transform of these joint distributions onto a plane 220. For the reference beam its transform is $$\int_0^{2a} f_R(x-a)\exp(-j2\pi vx)dx = \quad (11)$$

$$\exp(-j2\pi va)\int_{-a}^{+a} f_R(z)\exp(-j2\pi vz)dz = \exp(-j2\pi va)F_R(v)$$

To ultimately achieve a correlation, the reference function is rotated about the center x=0, such that it is encoded onto recorder 200 as $f_R[-(x-a)]$. The transform of this (real) function is obtained by use of the conjugate Fourier transform $F_R^*(v)$.

For the signal beam, its transform is $$\int_{2a}^{0} f(x+a)\exp(-j2\pi vx)dx = \quad (12)$$

$$\exp(+j2\pi va)\int_{-a}^{+a} f(z)\exp(-j\pi vz)dz = \exp(+j2\pi va)F(v)$$

The combined light amplitude distribution in plane is $$M(v)=\exp(-j2\pi va)F_R^*(v)+\exp(+j2\pi va)F(v) \quad (13)$$

As a square law device, detector 230 responds to the light intensity distribution I(v) in plane 220. Thus, $$I(v)=M(v)M^*(v)=|F|^2+|F_R|^2+2|F_R||F|\cos[4\pi va+\phi(v)-\phi_R(v)] \quad (14)$$

where $\phi(v)$ and $\phi_R(v)$ are the phase angles associated with the respective transforms. Again, two leading terms in the expression for the output are those that mask the true correlation. Furthermore, if the functions $f_R(X-a)$ and $f(x+a)$ contain bias terms, the output is further seriously degraded.

To achieve a correlation measure with the joint transform system, the light distribution $I(v)$ must first be measured and then re-recorded onto another input device. After illuminating the new recording with a coherent beam and Fourier transforming the transmitted, modulated beam via a lens, the output distribution in the back focal plane of the transform lens will be proportional to the inverse Fourier transform of the light intensity distribution $I(v)$ of Equation (14). This output pattern will contain the desired, but degraded, correlation. All the other variations of optical correlators suffer from the same degradation problems as the aforementioned embodiments.

In accordance with the invention, a heterodyne system is used to eliminate the problems associated with optical correlators, as hereinbefore discussed. The basic concept is to derive the temporal frequency used for heterodyne detection directly from the laser. In the presence of a magnetic field, a laser, such as, for example, HeNe, will emit coherent radiation at two different frequencies, such as, for example, $f_1$ and $f_2$, due to the Zeeman effect. For a fixed magnitude field strength, the frequency difference $\Delta f=f_2-f_1$ is constant. A similar phenomena called the Stark effect could be achieved with an electric field. Both beams will be circularly polarized, but in an opposite sense. Polarization wave plates are then used to convert the oppositely circularly polarized components to linearly polarized beams. These linearly polarized beams are orthogonal and are capable of being spatially separated, using a polarization-sensitive beam splitter, as shown in FIG. 4, which illustrates an embodiment of the front end portion of the optical correlator of the invention.

Figure 4:
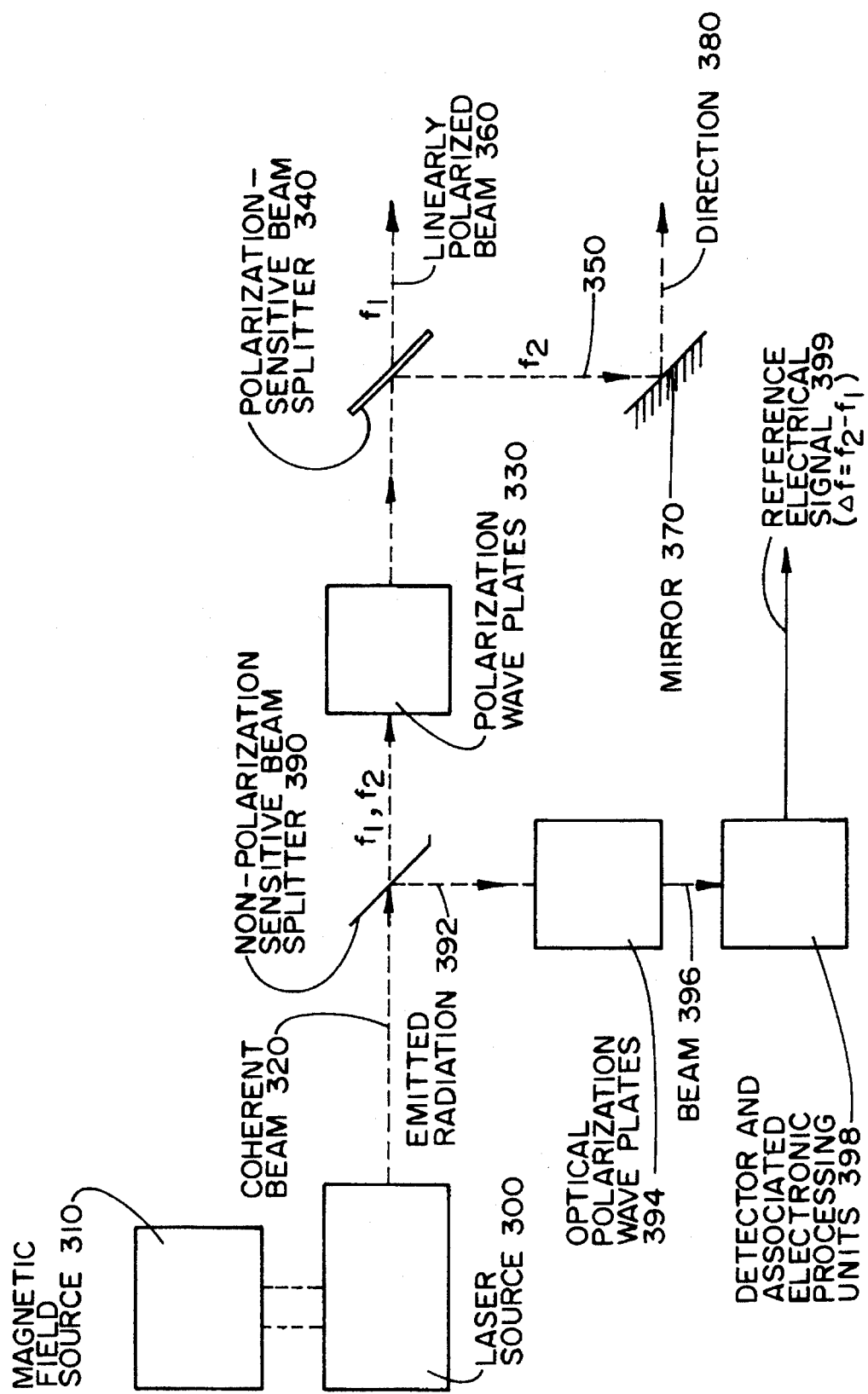
FIG. 4 is a block diagram of an embodiment of the front end portion of the optical correlator of the invention.

In FIG. 4, a laser source 300 in the presence of a magnetic field source 310 emits a coherent beam 320 with optical frequency components $f_1$ and $f_2$. Magnetic field source 310 could be included as an integral part of some lasers of source 300. Polarization wave plates 330 convert the oppositely circularly polarized component beams $f_1$ and $f_2$ into orthogonal linearly polarized component beams. A polarization-sensitive beam splitter 340 causes one of the linearly polarized beams to be reflected. The reflected linearly polarized component beam $f_2$ is indicated as 350. The other linearly polarized beam $f_1$, indicated as 360, is transmitted through beam splitter 340. Beam 360 is considered to have an optical frequency of $f_1$. A mirror 370 may be used to redirect beam 350 at optical frequency $f_2$ in a direction 380, similar to that of beam 360.

To obtain the electronic reference signal from the laser beam, a non-polarization sensitive beam splitter 390 reflects a portion of emitted radiation 392. Optical polarization components 394, such as, for example, waveplates, are used to provide a beam 396 in which the polarization directions of both frequency component beams are colinear. A detector and associated electronic processing units 398 generate a reference electrical signal 399 at the difference frequency $\Delta f=f_2-f_1$.

Figure 5:
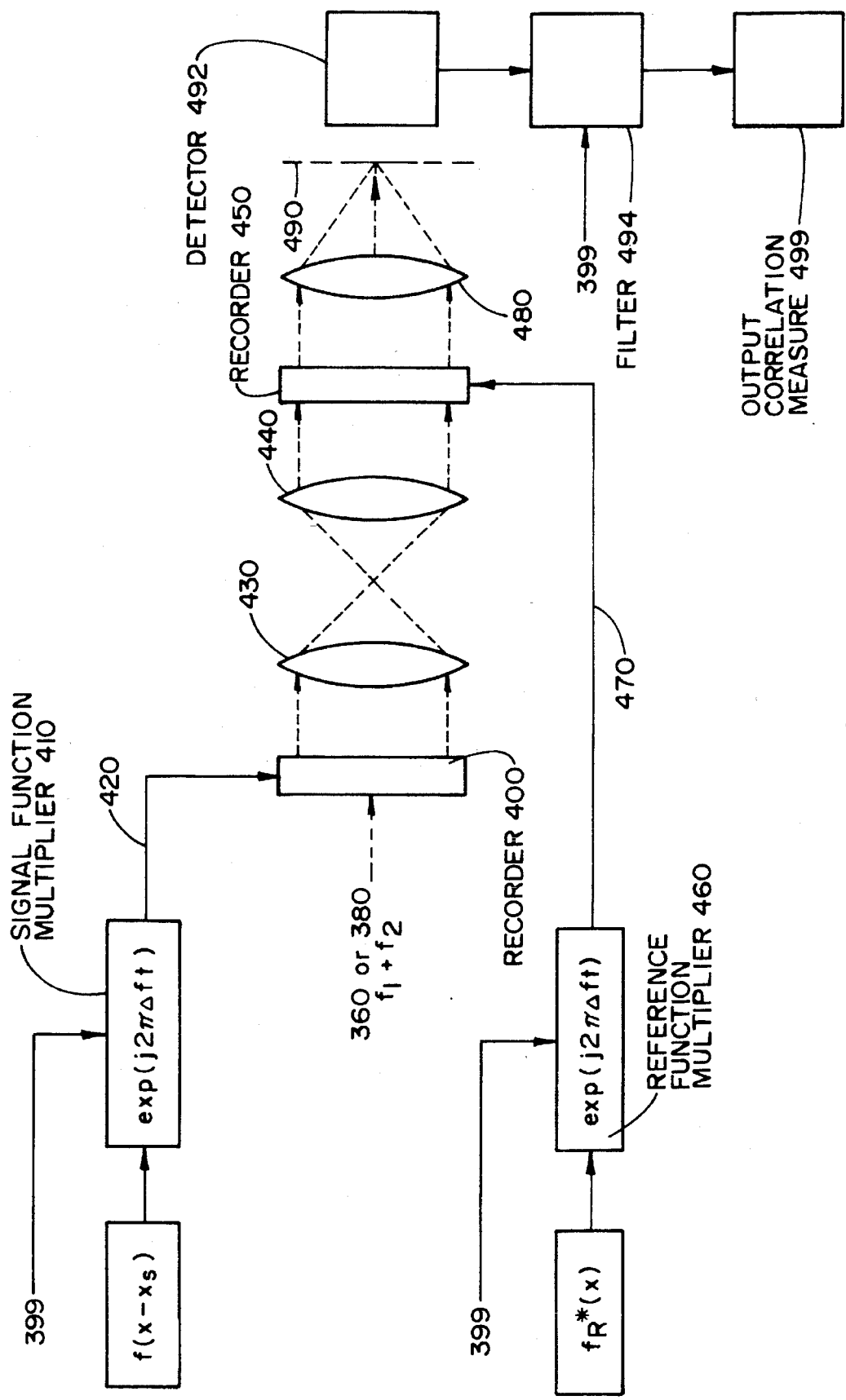
FIG. 5 is a block diagram of an embodiment of the rear end portion of the optical correlator of FIG. 4.

The optical correlator of the invention, shown in FIG. 5, illustrates how the temporal frequency difference $\Delta f$ between the beams $f_1$ and $f_2$ is used to provide a correct correlation measure without unwanted bias errors. A bias level is either inherent in the recording devices or added by necessity to the signals. The signal and reference functions are first multiplied by the phase term $\exp(j2\pi\Delta ft)$ in multipliers 410 and 460, respectively. The modulating waveform in recording device 400 is $f(x-x_s)\exp(j2\pi\Delta ft)$ and the waveform in recording device 450 is $f_R^*(x)\exp(j2\pi\Delta ft)$. Lenses 430 and 440 project the waveform from recorder 400 onto the waveform in recorder 450. The light amplitude exiting recorder 450 is $$M(x)=\exp(j\omega t)[B_o+f(x-x_s)\exp(j2\pi\Delta ft)][B_r+f_R^*(x)\exp(j2\pi\Delta ft)] \quad (15)$$

where $\omega=2\pi f_1$ or $2\pi f_2$, but not both frequencies simultaneously. $\omega$ 2 cts as a carrier frequency and plays no role in the correlation measurement. Then, $$M(x)=B_oB_R+\exp(j2\pi\alpha ft)[B_o f_R^*(x)+B_o f(x-x_s)]+\exp[2(j2\pi\Delta ft)][f_R^*(x)f(x-x_s)] \quad (16)$$

A lens 480 projects the Fourier transform of $M(x)$ onto a plane 490. The third term in Equation (16) is modulated at twice the temporal frequency difference $2\Delta f$. Its Fourier transform is $$C(v,s_s)=\exp[2(j2\pi\Delta ft)]\int f_R^*(x)f(x-x_s)\exp(j2\pi xv)dx \quad (17)$$

At $v=0$, the correlation integral is $$C(0,x_s)=\exp[2(j2\pi\Delta ft)]\int f_R^*(x)f(x-x_s)dx \quad (18)$$

Thus, by detecting the pattern in plane 490 in the vicinity of $v=0$ with a detector 492 and setting a filter 494 to pass only the temporal signal oscillating at $2\Delta f$, the output correlation measure is obtained at 499. The output signal is the square of the correlation value.

The joint transform correlator can also be used to obtain a bias error-free correlation measure. The reference and signal functions are first multiplied by the phase terms $\exp(\pm j2\pi\Delta ft)$ in a manner similar to the aforedescribed system. The light amplitude components transmitted through recording regions 200A and 200B of FIG. 3 are then expressed by $$B_o+\exp(+j2\pi\Delta ft)f(x+a) \text{ and } B_R+\exp(-j2\pi\Delta ft)f_R[-(x-a)] \quad (19)$$

including the bias terms. The Fourier transform of the sum of these components is, using Equations (13) and (19), $$M(v)=(B_o+B_R)\text{sinc}(v)+\exp(+j2\pi\Delta ft)f(v)\exp(j2\pi va)+\exp(-j2\pi\Delta ft)F_R^*(v)\exp(-j2\pi va) \quad (20)$$

The corresponding light intensity is $$I(v)=M(v)M^*(v)=B^2+|F|^2+|F_R|^2+2Re[(F+F_R\exp(j\theta)]+2Re[FF_R\exp(j2\theta)] \quad (21)$$

where $$B=(B_o+B_R)\text{sinc}(v) \text{ and } \theta=2\pi(\Delta ft+va) \quad (22)$$

The last term in Equation (21) is $$2|F_R||F|\cos[2\pi(2\Delta ft+2va)+\phi(v)+\phi_R(v)] \quad (23)$$

and is free of any device bias level. Thus, detector 230 in plane 220 of FIG. 3, which responds only to the temporal intensity variation at twice the offset modulating frequency, $2\Delta f$, will yield the bias error-free correlation. The pattern described in Equation (23) is further processed in the customary way for a joint transform correlator.

Figure 6:
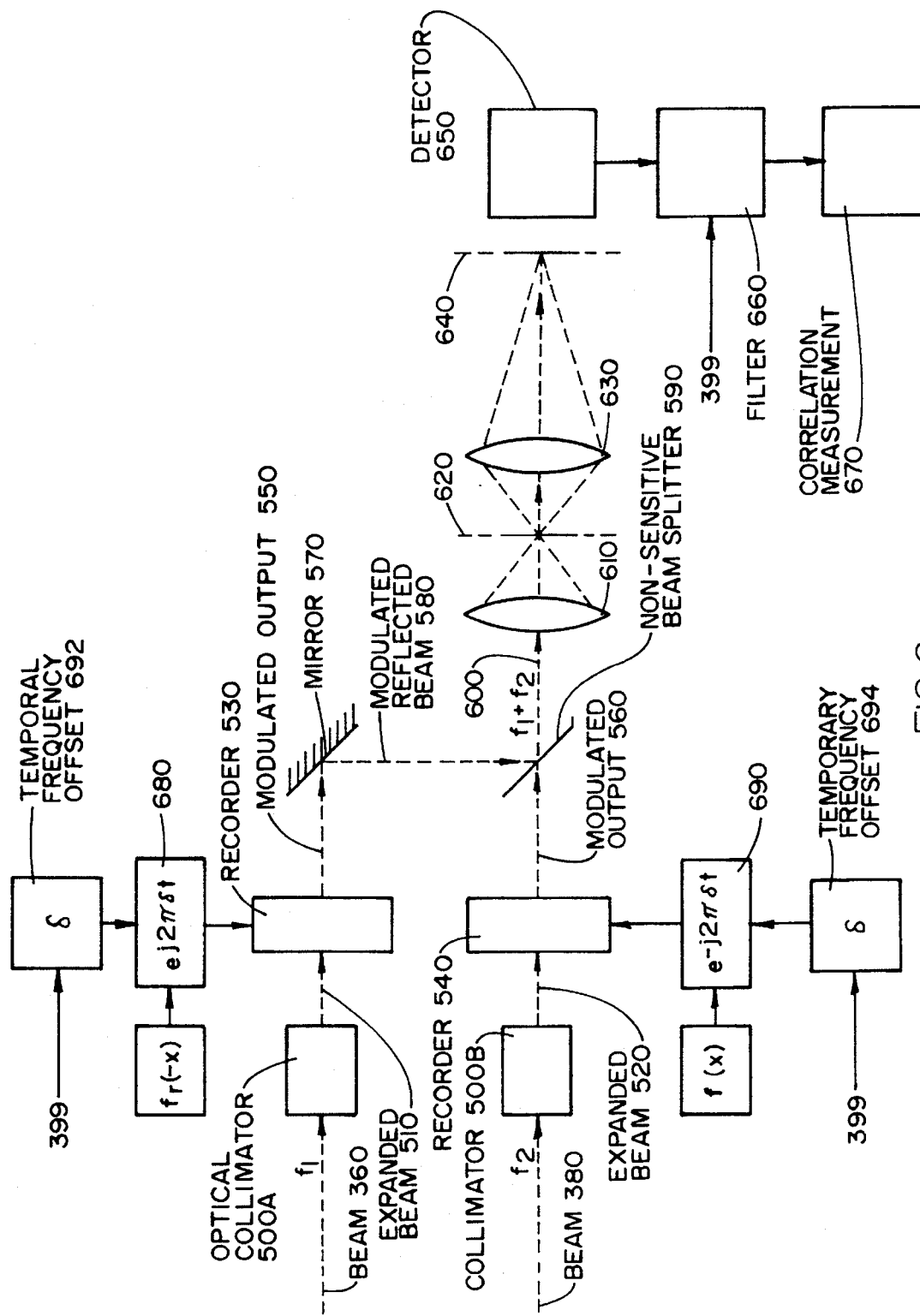
FIG. 6 is a block diagram of another embodiment of the rear end portion of the optical correlator of FIG. 4.

The optical correlator shown in FIG. 6 is an alternative to FIG. 5 and will result in a bias error-free correlation measurement. The separate beams 360 and 380 from the system shown in FIG. 4 are expanded and collimated by optical components 500A and 500B. Expanded beams 510 and 520 exiting from the optical components 500A and 500B, respectively, illuminate recording devices or recorders 530 and 540, respectively. Signals to be correlated are encoded onto these devices. A bias level is either inherent in the recording devices 530 and 540, or added by necessity to the signals. Modulated outputs 550 and 560 of recorders 530 and 540, respectively, are added using mirror 570, the reflected beam 580 of mirror 570 and a non-sensitive beam splitter 590.

Combined beams 600 are then Fourier transformed using lens 610. The Fourier transform of the summed beams appears as a light amplitude pattern in back focal plane 620. Inverse transform lens 630 forms an output pattern in an output or correlator plane 640. Detector 650 and associated electronic filter circuit 660 process the output of detector 650 to generate a true correlation measurement 670. Filter circuit 660 is controlled by output 399 of detector and associated electronic processing units 398 of FIG. 4.

The temporal amplitudes of light beams 510 and 520 are represented by $\exp(j2\pi f_1 t)$ and $\exp(j2\pi f_2 t)$, respectively. Light amplitudes 550 and 560 exiting recorders 530 and 540, respectively, are proportional to $$\exp(j2\pi f_1 t)[B_R + \exp(-j2\pi\delta t)f_R(x-x)] \text{ and } \exp(j2\pi f_2 t)[B_o + \exp(j2\pi\delta t)f(x-x_s)] \quad (24)$$

where $\delta$ is a temporal frequency offset 680 and 690 that is first used to modify the reference and signal functions, respectively, prior to encoding onto recorders 530 and 540, reference function is needed to generate the conjugate of its Fourier transform. The temporal frequency modulation $\delta$ is derived from $\Delta f$ though temporal frequency offsets, 692 and 694. Hence, it is linked in a one-to-one correspondence with $\Delta f$. In the event that $\Delta f$ changes intentionally, or by extraneous events, the temporal frequency modulation $\delta$ will follow in a related manner. In this way, the resetting of all frequency tuned components is avoided.

Combined beams 600 have an optical amplitude of $$T(x,t,x_s) = C_1 \exp(j2\pi f_1 t)[B_R + \exp(-j2\pi\delta t)f_R(-x)] + C_2 \exp(j2\pi f_2 t)[B_o + \exp(j2\pi\delta t)f(x-x_s)] \quad (25)$$

For convenience, let $C_1$ and $C_2 = 1$.

Lens 630 reimages the light amplitude distribution of Equation (25) onto output plane 640. Lens 630 can provide optical phase corrections that would appear if just a single lens, such as, for example, lens 610, were used to image the distribution of Equation (25). The output light intensity pattern can be expressed as $$D(x,t,x_s) = TT^*(x,t,x_s) \quad (26)$$

The term of interest derived from Equation (26), which contains the temporal oscillation of $2\delta$ centered about a carrier frequency of $\Delta f$, is $$D(x,t,x_s) = 2Re[\exp(j2\pi\Delta ft) \exp(j4\pi\delta t)f(x-x_s) f^*(x)] \quad (27)$$

Collecting all of the light distribution in this temporal frequency region results in a measure of the correlation, $$C(t,x_s) = 2Re|\exp(j2\pi\Delta ft) \exp(j4\pi\delta t) \int f(x-x_s) f^*(x) dx| \quad (28)$$

A mode of operation similar to that of the joint transform correlator can be carried out with this system. The spatial Fourier transform distribution in plane 620 is $$M(v) = \exp(j2\pi f_1 t)[B_R \text{sinc}(v) + \exp(-j2\pi\delta t)F_R^*(v)] + \exp(j2\pi f_2 t)[B_o \text{sinc}(v) + \exp(j2\pi\delta t)F(v)\exp(j2\pi v x_s)] \quad (29)$$

A recording of the intensity pattern $M(v)M^*(v)$ of the temporal frequency component $2\delta$ will contain the Fourier transforms product of $F_R^*(v)F(v)\exp(j2\pi v s_s)$ from which the correlation value can be obtained, as hereinbefore stated.

The method of optical correlation of the invention avoids bias level terms in the optical correlation output. The method comprises the steps of deriving coherent polarized component beams having frequencies $f_1$ and $f_2$ from a light source and converting the component beams to a reference electrical signal $\Delta f = f_2 - f_1$. The sum $f_1 + f_2$ of the component beams is correlated under the control of a multiple of the reference electrical signal $\Delta f$. The Fourier transform of the amplitude of correlated light is projected and detected.

While several embodiments of the present invention have been shown and described, it is to be understood that many changes and modifications may be made thereunto without departing from the spirit and scope of the invention as defined in the appended claims.

What is claimed is:

1. An optical correlator system comprising light source means for providing a coherent beam of light having two oppositely circularly polarized component beams having two different frequencies $f_1$ and $f_2$;

first beam splitting means for transmitting the two oppositely polarized component beams $f_1$ and $f_2$ and for reflecting a portion of emitted radiation;

linear polarizing means for orthogonal linear polarization of said component beams $f_1$ and $f_2$ transmitted by said first beam splitting means;

second beam splitting means for transmitting the linearly polarized beam $f_1$ in a determined direction and reflecting the other linearly polarized beam $f_2$;

directing means for directing the reflected beam $f_2$ in the determined direction;

optical polarization means for changing the portion of emitted radiation reflected by said first beam splitting means to frequency component beams $f_1$ and $f_2$ having colinear polarization directions;

processing means for providing from said frequency component beams an electrical reference signal $\Delta f = f_2 - f_1$;

signal processing means for multiplying a signal function by a phase term under the control of the electric reference signal $\Delta f$ and recording a first modulated waveform;

reference signal processing means for multiplying a reference function by said phase term under the control of said reference signal and recording a second modulated waveform;

optical transfer means for projecting the first waveform onto the second waveform;

optical means for projecting the Fourier transform of the amplitude of light of said second modulated waveform onto a plane;

detecting means for detecting the pattern in the plane of the Fourier transform when v is substantially equal to zero, wherein v is the transform variable, said detecting means having an output providing said Fourier transform;

filtering means controlled by said reference signal for filtering out the entire output of said detecting means except a temporal signal oscillating at $2\Delta f$; and output means having an input inputting said temporal signal and a output outputting a signal which is the square of the correlation value.

2. An optical correlator system as claimed in claim 1, wherein said light source means provides a laser beam.

3. An optical correlator system as claimed in claim 1, wherein said first beam splitting means consists of non-polarization sensitive beam splitting means, said linear polarizing means consists of polarizing means for changing the oppositely circularly polarized component beams into two orthogonal linearly polarized component beams $f_1$ and $f_2$ and said second beam-splitting means consists of polarization-sensitive beam splitting means.

4. An optical correlator system as claimed in claim 1, wherein said signal processing means comprises a signal multiplier for multiplying said signal function by the phase term under the control of said reference signal and first recording means for recording a modulated waveform from said signal multiplier and said reference signal processing means comprises a reference multiplier for multiplying said reference function by said phase term under the control of said reference signal and second recording means for recording a modulated waveform from said reference multiplier.

5. An optical correlator system as claimed in claim 4, wherein said phase term is exp $(j2\pi\Delta ft)$, and wherein $j= \sqrt{-1}$, $\Delta f$=frequency of the reference signal, and $t=$ time.

6. An optical correlator system as claimed in claim 5, wherein said modulated waveform recorded in said first recording means is $f(x-x_s)$ exp $(j2\pi\Delta ft)$ and the modulated waveform recorded in said second recording means is $f_R^*(x)$ exp $(j2\pi\Delta ft)$.

7. An optical correlator system as claimed in claim 6, wherein the amplitude of light output by said second recording device is equal to $$\exp(j\omega t)[B_o+f(x-x_s)\exp(j2\pi\Delta ft)][B_R+f_R^*(x)\exp(j2\pi\Delta ft)],$$

wherein $\omega=2\pi f$, or $2\pi f_2$, and wherein $B_o$ is the bias level associated with the signal, $B_R$ is the bias level associated with the reference signal, $f_F^*$ is the reference function, x is the parameter and $x_s$ is the shift or displacement parameter.

8. An optical correlator system comprising light source means for providing a coherent beam of light having two oppositely circularly polarized component beams having two different frequencies;

non-polarization sensitive beam splitting means for transmitting the two oppositely circularly polarized component beams and for reflecting a portion of emitted radiation;

polarizing means for changing the oppositely circularly polarized component beams into two orthogonal linearly polarized component beams;

polarization-sensitive beam splitting means for reflecting one of the linearly polarized beams and for transmitting the other of said linearly polarized beams in a determined direction;

mirror means for directing the reflected one of said linearly polarized beams in the determined direction;

optical polarization means for changing the reflected portion of emitted radiation to frequency component beams having colinear polarization directions;

detector and processing means for providing an electrical reference signal from said frequency component beams which is the difference between the two frequencies;

signal multiplier means for multiplying a signal function by a phase term under the control of said reference signal;

reference multiplier means for multiplying a reference function by said phase term under the control of said reference signal;

first recording means for recording a modulated waveform from said signal multiplier means;

second recording means for recording a modulated waveform from said reference multiplier means;

optical transfer means for projecting the waveform recorded on said first recording means onto the waveform recorded on said second recording means;

optical means for projecting the Fourier transform of the amplitude of light output by said second recording means onto a plane;

detecting means for detecting the pattern in the plane of the Fourier transform when v is substantially equal to zero, wherein v is the transform variable, said detecting means having an output providing said Fourier transform;

filtering means controlled by said reference signal for filtering out the entire output of said detecting means except a temporal signal oscillating at $2\Delta f$; and output means having an input inputting said temporal signal and an output outputting a signal which is the square of the correlation value.

9. An optical correlator system as claimed in claim 8, wherein said light source means provides a laser beam.

10. An optical correlator system as claimed in claim 8, wherein said phase term is exp $(j2\pi\Delta ft)$, and wherein $j= \sqrt{-1}$, $\Delta f$=frequency of the reference signal, and $t=$ time.

11. An optical correlator system as claimed in claim 10, wherein said modulated waveform recorded in said first recording means is $f(x-x_s)$ exp $(j2\pi\Delta ft)$ and the modulating waveform recorded in said second recording means is $f_R^*(x)$ exp $(j2\pi\Delta ft)$.

12. An optical correlator system as claimed in claim 10, wherein the amplitude M(x) of light output by said second recording device is equal to $$\exp(j\omega t)[B_o+f(x-x_s)\exp(j2\pi\Delta ft)][B_R+f_R^*(x)\exp(j2\pi\Delta ft)],$$

where $\omega=2\pi f_1$, or $2\pi f_2$, and wherein $B_o$ is the bias level associated with the signal, $B_R$ is the bias level associated with the reference signal, $f_R^*(x)$ is the reference function, x is the parameter and $x_s$ is the shaft or displacement parameter.

13. An optical correlator system comprising light source means for providing a coherent beam of light having two oppositely circularly polarized component beams having two different frequencies $f_1$ and $f_2$;

first beam splitting means for transmitting the two oppositely polarized component beams $f_1$ and $f_2$ and for reflecting a portion of emitted radiation;

linear polarizing means for orthogonal linear polarization of said component beams $f_1$ and $f_2$ transmitted by said first beam splitting means;

second beam splitting means for transmitting the linearly polarized beam $f_1$ in a determined direction and reflecting the other linearly polarized beam $f_2$;

directing means for directing the reflected beam $f_2$ in the determined direction;

optical polarization means for changing the portion of emitted radiation reflected by said first beam splitting means to frequency component beams $f_1$ and $f_2$ having colinear polarization directions;

processing means for providing from said frequency component beams an electrical reference signal $\Delta f=f_2-f_1$;

optical means for expanding and collimating said frequency component beams $f_1$ and $f_2$;

signal processing means for modifying a signal function by a temporal frequency offset under the control of the electric reference signal $\Delta f$ and recording a first modulating waveform;

reference signal processing means for modifying a reference function by said temporal frequency offset under the control of said reference signal and recording a second modulating waveform;

optical transfer means for recording the expanded and collimated beams under the control of the modified signal and reference functions;

optical means for projecting the Fourier transform of the amplitude of light of the combined modulated beams onto a plane;

detecting means for detecting the pattern in the plane of the Fourier transform when v is substantially equal to zero, wherein v is the transform variable, said detecting means having an output providing said Fourier transform;

filtering means controlled by said reference signal for filtering out the entire output of said detecting means except a temporal signal oscillating at $2\Delta f$; and output means having an input inputting said temporal signal and an output outputting a signal which is the square of the correlation value.

14. An optical correlator system as claimed in claim 13, wherein said temporal frequency offset is $\delta$ and is derived from $\Delta f$, and wherein $\Delta f$=frequency of the reference signal, and t=time.

15. A method of optical correlation which avoids bias level terms in the optical correlation output, said method comprising the steps of deriving coherent polarized component beams having frequencies $f_1$ and $f_2$ from a light source;

converting said component beams $f_1$ and $f_2$ to a reference electrical signal $\Delta f = f_2 - f_1$;

correlating the sum $f_1 + f_2$ of said component beams under the control of a multiple of said reference electrical signal $\Delta f$; and projecting and detecting the Fourier transform of the amplitude of correlated light.

16. An optical correlator system comprising:

a light source for providing a coherent beam of light having first and second component beams having frequencies f and $f_2$ respectively;

a conversion subsystem for converting said first and second component beams to a reference signal having a frequency $\Delta f = f_2 - f_1$;

a correlator subsystem for correlating the sum of the first and second component beams under the control of said reference signal;

a lens assembly for projecting the Fourier transform of the correlated light onto a detection plane; and an optical detector for detecting said Fourier transform of the correlated light on the detection plane.

17. An optical correlator system according to claim 16, wherein the conversion subsystem includes:

a beam splitter for transmitting a first portion of each of the first and second component beams, and for reflecting a second portion of each of the first and second component beams;

an optical polarizer to polarize in a colinear direction the reflected portions of the first and second component beams; and an electro-optical processor for receiving the colinearly polarized component beams and generating therefrom the reference electrical signal.

18. An optical correlator system according to claim 16, wherein the correlator subsystem includes:

a signal processor for multiplying a signal function by a phase term under the control of $\Delta f$ and recording a first modulated waveform; and a reference processor for multiplying a reference function by said phase term under the control of the reference signal and recording a second modulated waveform.

19. An optical correlator system according to claim 18, wherein the correlator subsystem further includes an optical transmitter for transmitting the sum of the first and second component beams through the first modulated waveform and onto the second modulated waveform to project the first waveform onto the second waveform.

20. An optical correlator system according to claim 16, wherein:

the optical detector generates an output signal providing said Fourier transform; and the system further includes a filter receiving the output signal from the optical detector and transmitting only a portion of said output signal having a temporal signal oscillating at $2\Delta f$.

* * * * *